(12) United States Patent
Langner et al.

(10) Patent No.: US 6,179,523 B1
(45) Date of Patent: *Jan. 30, 2001

(54) METHOD FOR PIPELINE INSTALLATION

(75) Inventors: Carl Gottlieb Langner, Spring; Ronald Marshall Bass, Houston, both of TX (US)

(73) Assignee: Shell Oil Company, Houston, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/625,425

(22) Filed: Mar. 26, 1996

Related U.S. Application Data

(60) Provisional application No. 60/009,364, filed on Dec. 29, 1995.

(51) Int. Cl.$^7$ .................................................. F16L 1/00
(52) U.S. Cl. ..................... 405/169; 405/158; 405/166; 405/170
(58) Field of Search .................... 405/158, 165, 405/166, 169–172; 166/338

(56) References Cited

U.S. PATENT DOCUMENTS

| | | |
|---|---|---|
| 972,308 | 10/1910 | Williamson . |
| 1,231,202 | 6/1917 | Saylor ................................. 285/50 |

(List continued on next page.)

FOREIGN PATENT DOCUMENTS

| | | |
|---|---|---|
| 103122 | 2/1938 | (AU) . |
| 1359445 | 7/1974 | (DE) . |
| 1532730 | 11/1978 | (DE) . |
| 2084284 | 4/1982 | (GB) .............................. F16L/53/00 |
| 1437587 | 5/1976 | (JP) . |
| 569815 | 9/1977 | (SU) . |

OTHER PUBLICATIONS

Krevelen, D. W., Univ. of Technology, Delft, The Netherlands, "Properties of Polymers", 3$^{rd}$ Edition (Revised). Elsevier: Amsterdam–Oxford–New York–Tokyo, 1990: pp. 641–653.

Gaylord, N. G., Gaylord Associates. Newark, New Jersey, "Polyethers—Part I. Polyalkylene Oxides and Other Polyethers": Interscience Publishers: New York–London–Sydney, pp. 9–80.

(List continued on next page.)

*Primary Examiner*—Eileen Dunn Lillis
*Assistant Examiner*—Tara L. Mayo

(57) ABSTRACT

A method for installing an offshore pipeline is disclosed in which the inner and outer pipes are structurally connected at a terminal end of a pipe-in-pipe flowline and centralizers are placed in the annulus to provide lateral support and maintain concentricity between the two pipes and to prevent buckling of the inner pipe. The working end of the pipeline is suspended under construction in a substantially vertical position within slips at the weld floor of a J-lay installation barge and sections of inner and outer pipe are added. Inner pipe is added by sections by grasping and orienting the section of inner pipe to a vertical position and the section is brought into abutting position with the inner pipe at the working end of the pipeline under construction, welded in place, and the weld is coated with an arc resistant material. Sections of outer pipe are added by grasping and reorienting to a vertical orientation, sliding the section down over the section of inner pipe just welded in place, bringing the section of outer pipe into abutting position with the working end of the pipeline under construction and welding it into place. The working end of the pipeline is then advanced through the slips to bring the end of the section of outer pipe added adjacent the weld floor and the foregoing steps are repeated as necessary to add additional sections of inner and outer pipe to complete the pipeline.

9 Claims, 4 Drawing Sheets

U.S. PATENT DOCUMENTS

| | | | |
|---|---|---|---|
| 2,096,279 | 10/1937 | Karcher | 255/28 |
| 2,217,857 | 10/1940 | Byck | 166/21 |
| 2,224,403 | 12/1940 | Lines | 392/478 |
| 2,306,831 | 12/1942 | Proctor | 392/466 |
| 2,660,249 | 11/1953 | Jakosky | 166/17 |
| 2,678,377 | 5/1954 | Justiz . | |
| 2,714,930 | 8/1955 | Carpenter | 166/60 |
| 2,757,738 | 8/1956 | Ritchey | 166/39 |
| 2,851,197 | 9/1958 | Colton | 222/146.5 |
| 2,982,354 | 5/1961 | Green | 166/60 |
| 3,184,958 | 5/1965 | Eaton | 73/40.5 |
| 3,423,570 | 1/1969 | Trabilcy | 219/301 |
| 3,432,186 | 3/1969 | Braun | 285/53 |
| 3,507,330 | 4/1970 | Gill | 166/248 |
| 3,547,193 | 12/1970 | Gill | 166/248 |
| 3,556,218 | 1/1971 | Tally, Jr. et al. | 166/265 |
| 3,605,888 | 9/1971 | Crowson et al. | 166/248 |
| 3,614,986 | 10/1971 | Gill | 166/303 |
| 3,620,300 | 11/1971 | Crowson | 166/248 |
| 3,630,038 | 12/1971 | Ando | 61/72.1 |
| 3,642,066 | 2/1972 | Gill | 166/248 |
| 3,706,872 | 12/1972 | Trabilcy | 219/300 |
| 3,789,188 | 1/1974 | Rudbarg | 219/301 |
| 3,859,503 | 1/1975 | Palone | 219/278 |
| 3,933,031 | 1/1976 | Uhlarik | 73/40.5 R |
| 3,944,262 | 3/1976 | Stiner et al. | 285/53 |
| 3,958,636 | 5/1976 | Perkins | 166/248 |
| 3,975,617 | 8/1976 | Othmer | 219/300 |
| 4,010,799 | 3/1977 | Kern et al. | 166/248 |
| 4,011,652 | 3/1977 | Black | 29/455 R |
| 4,017,102 | 4/1977 | Henderson | 285/41 |
| 4,140,179 | 2/1979 | Kasevich et al. | 166/248 |
| 4,319,632 | 3/1982 | Marr, Jr. | 166/60 |
| 4,401,162 | 8/1983 | Osborne | 166/248 |
| 4,450,711 | 5/1984 | Claude | 73/40.5 R |
| 4,496,174 | 1/1985 | McDonald et al. | 285/53 |
| 4,553,023 | 11/1985 | Jameson et al. | 219/301 |
| 4,644,780 | 2/1987 | Jeter | 73/40.5 R |
| 4,645,906 | 2/1987 | Yagnik et al. | 392/469 |
| 4,667,505 | 5/1987 | Sharp | 73/40.5 R |
| 4,684,786 | 8/1987 | Mann et al. | 219/297 |
| 4,716,960 | 1/1988 | Eastlund et al. | 166/60 |
| 4,839,644 | 6/1989 | Safinya et al. | 340/854.3 |
| 4,861,074 | 8/1989 | Eastlund et al. | 285/53 |
| 4,874,925 | 10/1989 | Dickenson | 249/301 |
| 4,992,001 * | 2/1991 | Harrison | 405/166 |
| 4,996,879 | 3/1991 | Kruka et al. | 73/592 |
| 5,072,622 | 12/1991 | Roach et al. | 73/40.5 R |
| 5,289,561 | 2/1994 | Filho | 392/478 |
| 5,421,675 * | 6/1995 | Brown et al. | 405/170 |
| 5,464,307 * | 11/1995 | Wilkins | 405/166 |
| 5,490,562 | 2/1996 | Arnold | 166/267 |
| 5,836,719 * | 11/1998 | Martin et al. | 405/166 |

OTHER PUBLICATIONS

Brochure—Why Use Skin Effect Pipe Heating? Thermo Systems Technology, Inc. Four Commerce Park Square, 23200 Chagrin Boulevard, Suite 600, Beachwood, Ohio 44122, Copyright 1991, 2 pp.

F. Aarseth and E. Bentsen, "Heating of Pipelines, and Power Supply to Subsea Electrical Equipment,"Aker Engineering a.s A. Bjømstad and B. Knutsen, Alcatel Contracting Norway a.s., DOT 1995, 23 pp.

"Taking Induction Heating Underwater," *Process Heating*, Jul./Aug. 1995, 1 p.

Fred S. Epstein and Gary L. White, "Understanding Impedance Heating," *Chemical Engineering*, May 1996, p. 112–118.

"Tubing Casing Wireless Telemetry (Tucas System)," Schlumberger web page (1993?/Jun. 1996), 16 pp. (See text of Supplemental Information Disclosure Statement re supposed date of technology described.).

Brochure—World Wide Experience List—Compressed Gas Insulated Transmission Bus System Type CGIT, ABB Power T & D Company Inc., 30 Oak Street, Westborough, MA 01581, USA, 6 pp. (Describes work from 1972. Dated Oct. 1996. See text of Supplemental Information Disclosure Statement re supposed date of technology described.).

Compressed Gas Insulated Transmission Bus Ducts, ABB Power T&D Company, CGIT/IPB Division, Westborough, MA USA, 22 pp. (Undated. Describes work from 1972. See text of Supplemental Information Disclosure Statement re supposed date of technology described.).

Brochure—New Double Pipe Insulated System (DPIS) Designed by Snamprogetti, Snamprogetti Offshore Division, 6 pp.

Brochure—Combi Pipe—the end of clogged pipelines, Alcatel Contracting Norway and Aker Engineering, 7 pp. (Undated. See text of Supplemental Information Disclosure Statement re supposed date of technology described.).

"Introduction to Direct Heating of Subsea Pipelines," overview by Statoil, Saga Petroleum, CSO Norge, Alcatel, Kabel Norge and EFI, Feb. 1998. (Undated. See text of Supplemental Information Disclosure Statement re supposed date of technology described.).

Anecdote—Fuel Oil Between Buildings (See text of Supplemental Information Disclosure Statement.).

Anecdote—Asphalt Transfer Liner from Tank Cars et al. (See text of Supplemental Information Disclosure Statement.).

Anecdote—Thermo Systems under river crossings. (See text of Supplemental Information Disclosure Statement.).

Monobloc Insulating Joints Type "IK".

N. B. Carson, "A New Method for Heat Tracing Long Pipelines," *ASME*, 74–Pet–35, paper presented at the Petroleum Mechanical Engineering Conference, Dallas, Texas, Sep. 15–18, 1974, pp. 24.

F. R. Newbold and T. K. Perkins, "Wellbore Transmission of Electrical Power", *The Journal of Canadian Petroleum Technology*, Jul.–Sep. 1978, Montreal, pp. 3–52.

K. H. Afkhampour, "A Novel Approach to Solving Downhole Fluid Flow Problems by Use of an Electric Heat– ing System," Paper No. PCIC–85–35, 12 pp.

R. Wash, "Electromagnetic Energy Helps Recovery," *Gulf Coast Oil World.*, Jun. 1986, pp. 18–19.

F. G. Bosch, K. J. Schmitt, and B. J. Eastlund, "Evaluation of Downhole Electric Impedance Heating systems f Paraffin Control," Paper No. PCIC–90–34 presented at Industry Applications Society 37th Annual Petroleum and Chemical Industry Conference, Houston, Texas, Sep. 10–12, pp. 223–227.

H. Collins and M.A.R. Lyle, "Progress Reported in Design of Reelable Insulated Subsea Flow Lines," *Oil and Gas Journal*, Sep. 24, 1990, pp. 102–106.

M.I. Mollison, "Foam Insulation Gets First Reeled Installation off Australia," *Oil and Gas Journal*, May 18, 1992, pp. 80–82.

"Dunbar in Depth," *Offshore Engineer*, Dec. 1994, 2 pp.

A. Anselmi et al., "TTDPIS: A New Underwater Technology in the Field of Traced Insulated Pipelines," 1994 OMAE, vol. 5, Pipeline Technology, *ASME*, 1994, pp. 69–76.

B. J. Eastlund et al., "New System Stops Paraffin Buildup," *Petroleum Engineer*, Jan. 1989, 3 pp.

C. G. Langer, "Engineering Report—1979 Construction of the Cognac 12–inch Pipeline From Mississippi Cany Block 194 to Southwest Pass East Bay Central Facilities, Offshore Louisiana,"ES No. 74–82, Job No. 560513, Shell Oil Company, Pipeline Construction Department, *, 6 pp.

The Electrothermic Co. (TEC), 4916 Bear Lane, P. O. Box 4227, Corpus Christi, TX 78408 advertisement/sale brochure, 4 pp.

"New Double Pipe Insulated System (DPIS) Designed by Snamprogetti", Snamprogetti Offshore Division, Vial de Gasperi 16, San Donato Milanese, Milan, Italy, advertisement, 6 pp.

Protest Document, Dec. 8, 1987 letter of Andrew W. Marr, Jr. to the Assistant Commissioner of Patents requesting issuance of U.S. Patent 4,716,960, available in that file history as of Jan. 5, 1988. (with attachments, total of 12 pages).

Stop Paraffin Build–up and Realize Your Well's Full Potential . . . Plug in Paratrol. International, Inc. (PTI), 15423 Vantage Parkway East, Houston, Texas 77032, advertisement, Copyright 1989, 6 pp.

"Skin Effect Pipe Heating Systems," Thermo Systems Technology, Inc. (TST), Four Commerce Park Square, 23200 Chagrin Boulevard, Suite 600, Beachwood, Ohio 44122, Copyright 1991, advertisement, 4 pp.

"General Product Specification—Pipeline Insulating Joint," HydroTech Systems, Engineered Pipeline Products, advertisement, 7 pp.

"Monolithic Pipeline Electrical Isolation Joints," Hydro-Tech Systems, Inc., Engineered Pipeline Products, advertisement, Nov. 1996, 6 pp.

"Cable–Free Electrical Systems for the Oil to Gas Industry," Production Technologies Company, L.L.C., 600 Kenrick, Suite C–30; Houston, Texas 77060, advertisement, Copyright 1996, 6 pp.

* cited by examiner

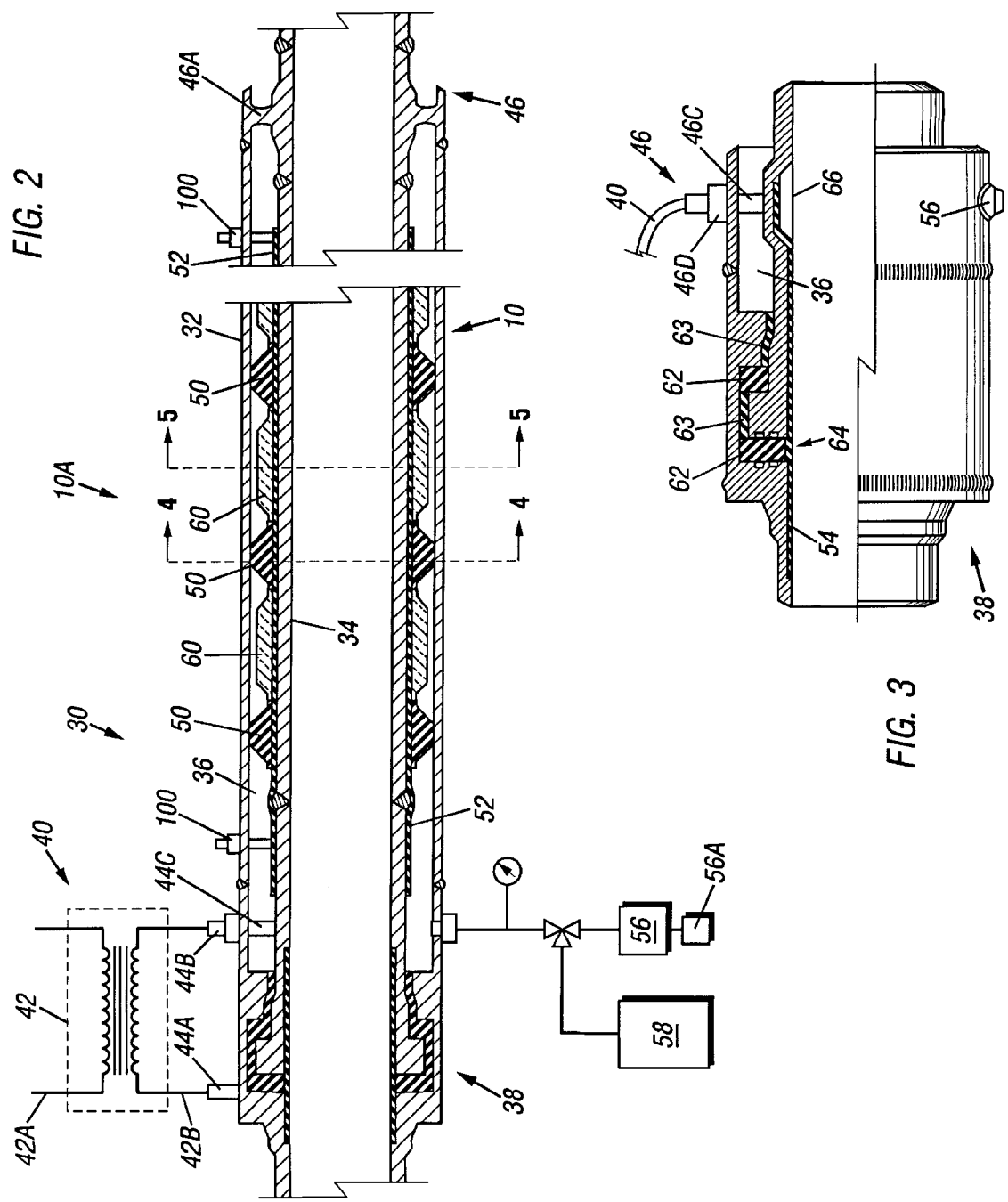

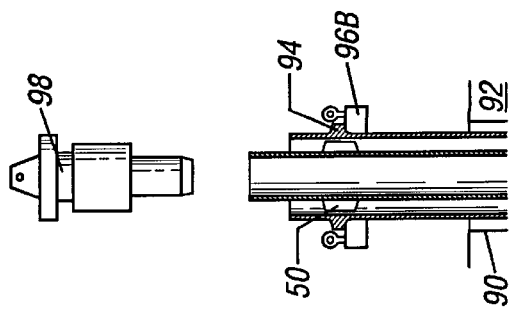
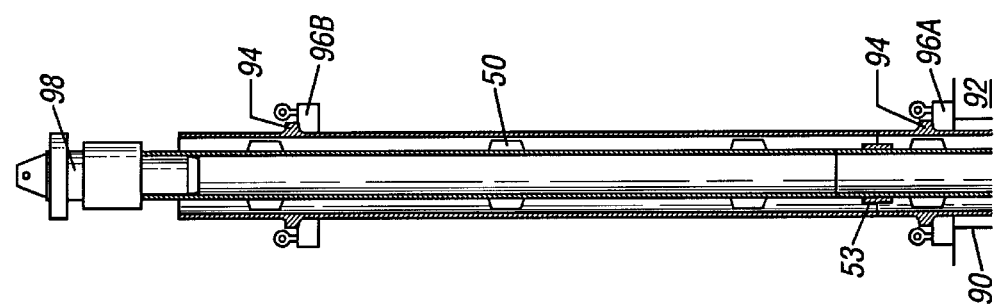
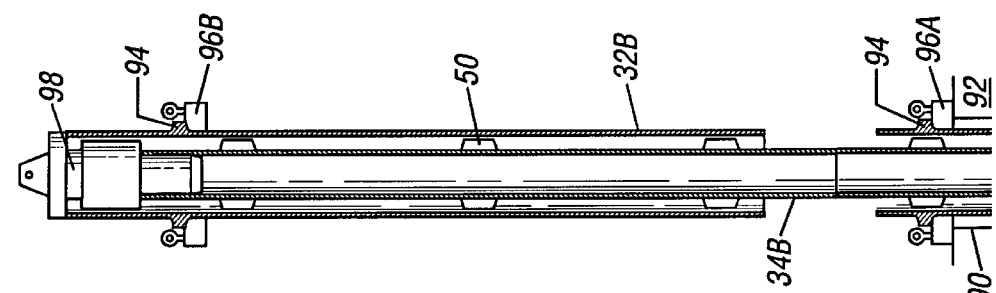
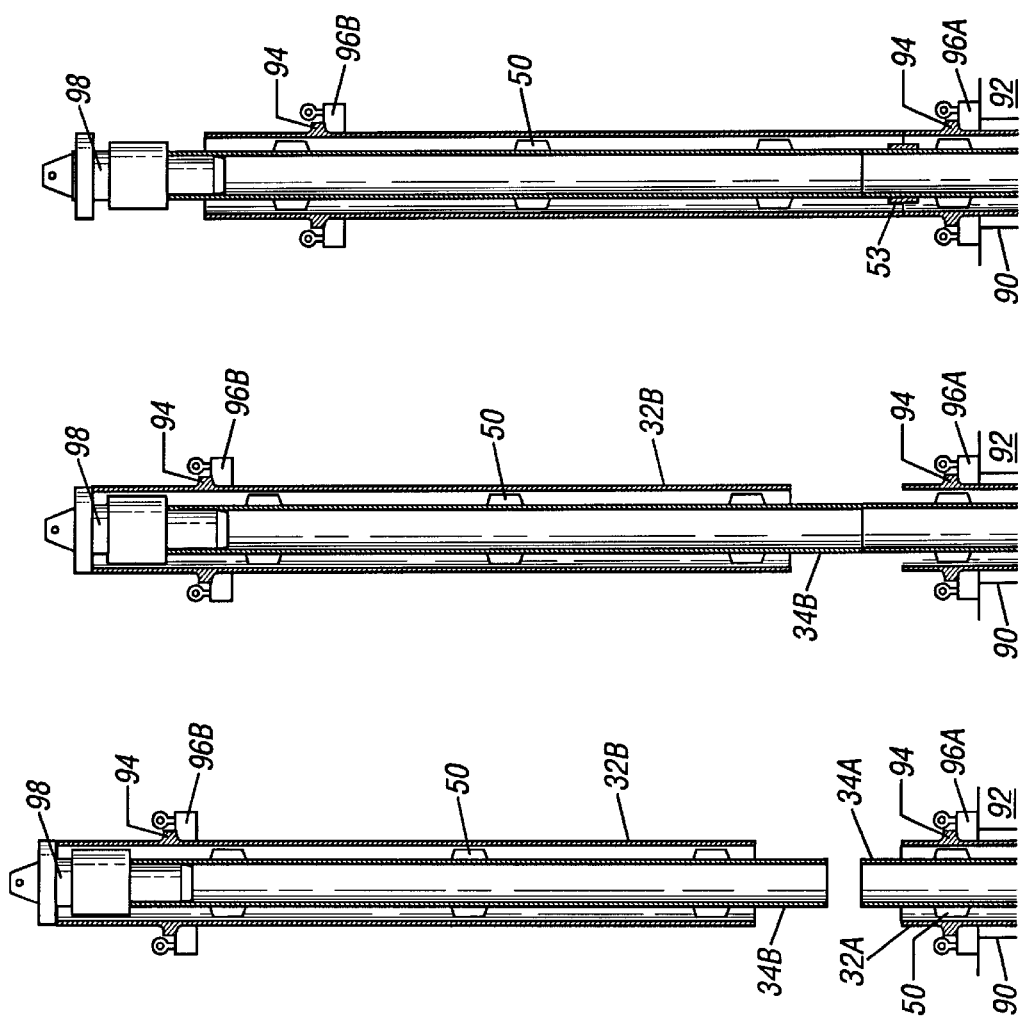

METHOD FOR PIPELINE INSTALLATION

This application claims the benefit of U.S. Provisional Application Ser. No. 60/009,364, filed Dec. 29, 1995.

BACKGROUND OF THE INVENTION

The present invention relates to a method for installing an offshore pipeline. More particularly, the present invention relates to a method for installing a pipe-in-pipe flowline system configured to provide direct electric resistance heating along the length of an extended subsea pipeline.

Offshore hydrocarbon recovery operations are increasingly pressing into deeper water and more remote locations. Here it is very expensive to provide surface facilities and it is desirable to minimize these requirements. Often satellite wells are completed subsea and are tied to remote platforms through extended subsea pipelines as a means to reduce the production cost. Even these platforms serving as central hubs in the offshore infrastructure are provided only the minimal facilities required for collecting and partially treating the well fluids before exporting them toward onshore facilities through yet more subsea pipelines.

The subsea pipelines crucial to this infrastructure prove a weak link as they are subject to plugging with hydrates or with paraffin deposition. Both hydrates and paraffins are of limited trouble at the pressures and temperatures experienced at the producing well, but can cause serious plugging problems when cooled to lower temperatures during pipeline transport. Further, heavier crude oils may exhibit fluid viscosity problems as the oil cools. A system for direct electric pipeline heating and methods of protecting pipelines from viscosity problems, hydrate formation and paraffin deposition have been devised to keep this infrastructure operational. This protection, though, is predicated on the installation of a pipe-in-pipe flowline with features appropriate for transmitting electrical power through the pipeline so as to heat the pipeline through electrical resistance and, in some circumstances, to drive electrical devices remote from the surface facilities.

Thus, there is a clear need for installation techniques appropriate for installing such a pipe-in-pipe flowline in long lengths for deepwater subsea pipeline service.

SUMMARY OF THE INVENTION

Toward providing these and other advantages, the present invention is a method for installing an offshore pipeline in which the inner and outer pipes are structurally connected at a terminal end of a pipe-in-pipe flowline and centralizers are placed in the annulus to provide lateral support and maintain concentricity between the two pipes, and to prevent buckling of the inner pipe. The working end of the pipeline is suspended under construction in a substantially vertical position within slips at the weld floor of a J-lay installation barge and sections of inner and outer pipe are added. Inner pipe is added by sections by grasping and orienting the section of inner pipe to a vertical position and the section is brought into abutting position with the inner pipe at the working end of the pipeline under construction, welded in place, and the weld is coated with an arc resistant material. Sections of outer pipe are added by grasping and reorienting to a vertical orientation, sliding the section down over the section of inner pipe just welded in place, bringing the section of outer pipe into abutting position with the working end of the pipeline under construction and welding it into place. The working end of the pipeline is then advanced through the slips to bring the end of the section of outer pipe added adjacent the weld floor and the foregoing steps are repeated as necessary to add additional sections of inner and outer pipe to complete the pipeline.

BRIEF DESCRIPTION OF THE DRAWINGS

The brief description above, as well as further advantages of the present invention will be more fully appreciated by reference to the following detailed description of the preferred embodiments which should be read in conjunction with the accompanying drawings in which:

FIG. 2 is a cross sectional view of a system for direct heating of a pipeline in accordance with one embodiment of the present invention;

FIG. 3 is a partially cross sectioned side elevational view of the pipe insulating joint assembly of the embodiment of FIG. 2;

FIGS. 7A–7D illustrate a progression of side elevational views of a method for installing the pipe-in-pipe direct heating system of the present invention.

DETAILED DESCRIPTION OF THE PREFERRED EMBODIMENTS

Figure 1:
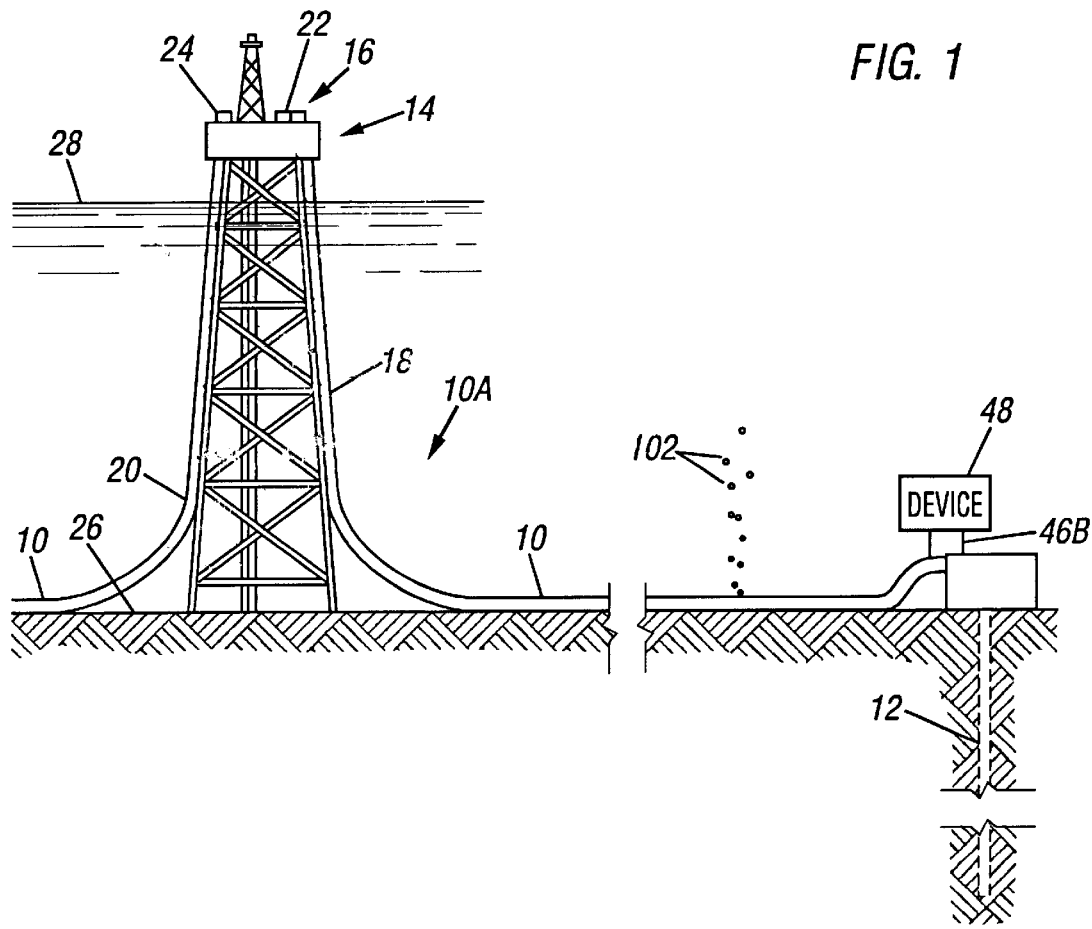
FIG. 1 is a side elevational view of a platform and a satellite subsea well connected by a subsea pipeline.

FIG. 1 illustrates the environment of the present invention. Here a remote satellite well 12 is connected to platform 14 with subsea pipeline 10 which is provided with a system 10A for direct electric heating in accordance with the present invention. Subsea pipeline 10 is brought to surface facilities 16 on platform 14 through import riser 18. In this illustration, surface facilities 16 include initial treatment facilities 22 as well as a power source, electrical generator 24. In similar fashion, an export riser 20 leads to a continuation of the pipeline 10 to shore facilities (not shown). It is important to note that subsea pipeline connecting satellite well 12 to its first treatment facility on the platform may be 20 to 40 or more miles long. Further, the pipeline is extremely inaccessible, resting on the seabed 26 that may be a half mile or more below the surface 28 of the ocean.

Components of the well fluids produced may be easily transported immediately at subsea well 12 where they retain the formation temperatures that often range from 150–180 degrees Fahrenheit. However, once produced, they have a long journey through a pipeline in a relatively cold environment. Even in relatively warm oceans such as the Gulf of Mexico, the ocean temperature at pipeline depth may be as cold as 40 degrees Fahrenheit or so. Unchecked, the heat loss across this temperature gradient over this long journey would easily cause the formation of hydrates and the precipitation of paraffins causing the pipeline flow area to become constricted or even to plug. Also, the fluid viscosities of some of the heavier crude oils are adversely impacted by low temperatures even before hydrates or paraffins become a problem. Further, upon occasion it is necessary to work over the well or to take the platform out of service for a period of time. In such instances, the pipeline is shut-in and flow ceases for a period, allowing the entire pipeline to cool to the seawater temperature.

These are the challenges of the present invention, to provide for direct heating along the length of the pipeline to prevent, or even reverse, hydrate formation and paraffin precipitation inside the pipeline, and to enhance the flow of viscous crudes.

FIG. 2 is a close up view of the direct electric pipeline heating system 10A. Pipeline 10 is shown to be a pipe-in-pipe flowline 30 having an electrically conductive carrier or outer pipe 32 and an electrically conductive product flowline or inner pipe 34 arranged longitudinally and substantially concentrically within the outer pipe. An annulus 36 is defined between the inner and outer pipes.

The first end or platform end of pipe-in-pipe flowline 30 is provided with a pipe insulating joint assembly 38 which stucturally joins, but electrically insulates the inner and outer pipes. The first end of the pipeline is terminated at the surface facilities 16 of platform 14 (see FIG. 1). Returning to FIG. 2, an electrical power input 40 is connected across inner pipe 34 and outer pipe 32. Here a first terminal 44A is provided for power input to the outer pipe 32 and a second terminal 44B is provided by an electrical penetrator 44C for power input to the inner pipe 34. The power input could be a DC source, but is here illustrated as an AC source interfacing through a transformer 42 having a primary coil 42A connected to the generator and a secondary coil 42B connected across the first and second terminals.

Thus pipe-in-pipe flowline 30 serves as a power transmission line, with the circuit completed by an electrical pathway connecting the inner and outer pipes at the second or remote end of the pipeline. In transmitting this power, the entire length of pipe-in-pipe flowline 30 serves as an electrical heater. Heat is produced by the electrical power loss from the current flow through the pipe-in-pipe flowline. For AC, this heating is due to a combination of interacting effects, including electrical resistance effects, magnetic effects (including magnetic hysteresis and eddy currents) and electromagnetic effects (including the skin effect and proximity effect).

In FIG. 2, the connection 46 for this pathway joining the inner and outer pipes is provided by electrically conductive bulkhead 46A. Alternatively, the pathway could be through an electrical device 48 as illustrated schematically in FIG. 1. This latter embodiment would provide another insulating joint assembly 38 at the second end of the pipeline with terminals 44A and 44B (see FIG. 2) to serve as a power takeout 46B at the subsea wellhead end of pipeline 10. Remote devices at the wellhead can thus be conveniently supplied with electrical power to perform such operations as boosting the well fluids pressure with a pump at the wellhead or preheating the produced fluids as they enter the pipeline. Further, power provided at the wellhead can be transported downhole, e.g., to drive a submersible pump in the wellbore or to heat the downhole tubing string.

It is necessary that inner pipe 34 be electrically isolated from outer pipe 32 along the entire length of pipe-in-pipe flowline 30. Direct contact is prevented with a plurality of electrically insulative centralizers 50 spaced at frequent intervals along annulus 36. However, it is also necessary to take steps to prevent arcing and other electrical discharges across the annulus. These steps may include careful quality control measures to prevent water and debris from entering the annulus, removing any sharp points or edges protruding into the annulus, providing an arc-resistant coating 52 on the outside of inner pipe 34, and providing a liner 54 at the power input and insulating joint assembly 38.

It is also useful to remove water from the annulus. This may be accomplished by forcing dry air or dry nitrogen through the annulus, or alternatively, by evacuating the annulus with a vacuum pump 56 to remove air and water vapor. Once evacuated, the annulus may be maintained under vacuum as part of a thermal insulation program or as part of a leak detection program as discussed later. Alternatively, it may be desired, after evacuating the annulus, to inject an arc-suppressing gas into the annulus such as Sulphur Hexafloride ($SF_6$) which is shown available in a reservoir 58 in FIG. 2.

Even though direct electric heating is supplied along the length of the pipeline, appropriate steps are taken in the illustrated embodiments to limit the heat loss from the pipeline to the environment. The amount of electrical power required to maintain the inner pipe and contents at a given temperature is minimized by minimizing the heat losses in the system. Direct conductive heat transfer is limited by selecting materials for centralizers 50 that are thermally insulative as well as electrically insulative and by properly selecting the centralizer length and the spacing between centralizers. Heat loss through convection can be reduced by maintaining the annulus under a vacuum, as discussed above, or by providing insulation panels 60 between centralizers 50. Radiant heat loss is reduced significantly by placing a low emissivity coating, such as an aluminum-coated mylar film, on inner pipe 34, but may already be a small factor if insulative panels 60 are used. Further, it should be noted that Sulphur Hexafloride ($SF_6$) can provide thermal insulation as well arc-suppression benefits. It may also be useful to hold the vacuum in the annulus for an extended period, e.g., over several weeks, before injecting the Sulphur Hexafloride ($SF_6$) in order to remove air defused into the open cells of the low density plastic foam of insulation panels 60.

FIG. 3 illustrates an insulated joint assembly 38 in greater detail. The inner pipe is isolated from the outer pipe by annular rings 62 formed from a material that is both strong and very resistant to electrical breakdown, e.g., a suitable epoxy or zirconia. Other annular spaces 63 within the insulating joint 38 are filled with similar high strength, electrically resistant materials. Liner 54 is bonded over each side of insulator interface 64 to prevent electrical breakdown due to brine in the well fluids. This figure also illustrates an electrical terminal 46 connected to the inner pipe by an electrical penetrator 46C which passes through an electrically insulated, vacuum-tight port 46D. In this embodiment the liner 54 terminates in a swage ring liner termination 66.

Figure 4:
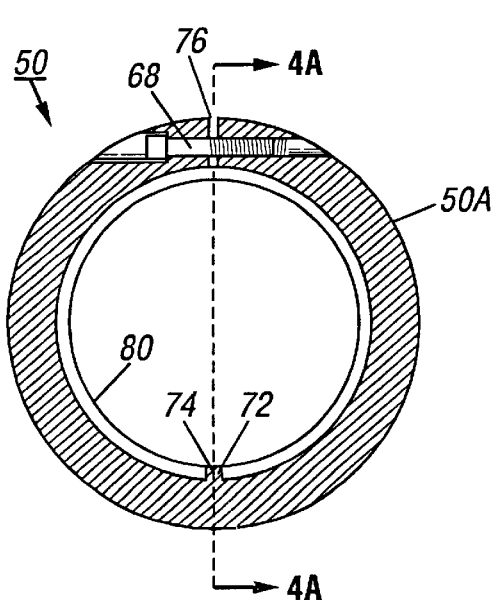
FIG. 4 is an axial cross sectional view of the centralizer of the embodiment of FIG. 2, taken at line 4—4 of FIG. 2.
Figure 4A:
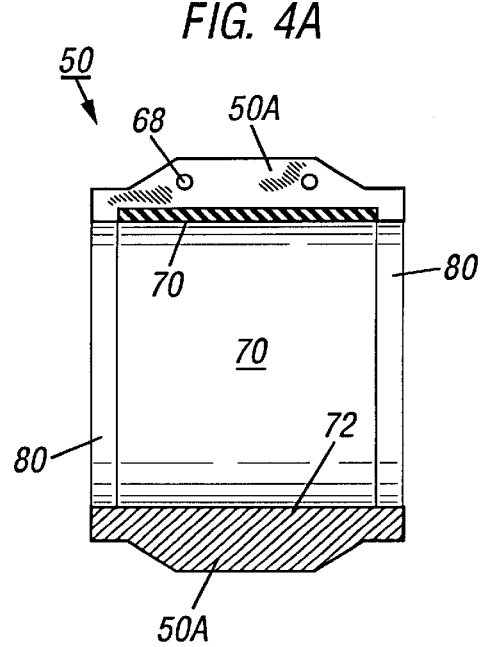
FIG. 4A is a longitudinal cross sectional view of the centralizer of FIG. 2, taken at line 4A—4A of FIG. 4.

FIGS. 4–4A illustrate one embodiment of insulated centralizer 50. Here centralizers are molded and/or machined from a strong, non-charring or char-resistant plastic such as Nylon or a polyacetal plastic such as that marketed under the name DELRIN to form collars 50A that are secured about inner pipe 34 with non-conductive elements such as non-metallic socket head cap screws 68. In this embodiment water and solid intrusion within the centralizer is blocked to prevent electrical discharge. A rubber liner 70 is secured about inner pipe 34 and collars 50A are placed around the rubber liner which is captured within shoulders 80. A key 72 on the collar fits within the gap 74 in the rubber liner. This key is opposite the open side or slit 76 of the collar and prevents any alignment of gap 74 and slit 76. Further, it may be desirable to completely seal the slit with a silicon adhesive caulk or a silicon gasket. Such precautions may be desirable to prevent contaminants from forming a bridge from the inner pipe to the outside of centralizer 50 which is in contact with outer pipe 32. In a another embodiment, the rubber liner 70 overlaps when wrapped around the inner pipe. This liner is taped in place and halves of a "keyless," two-piece collar 50A are then clamped over the rubber liner and tightened down with opposing screws 68.

Figure 8:
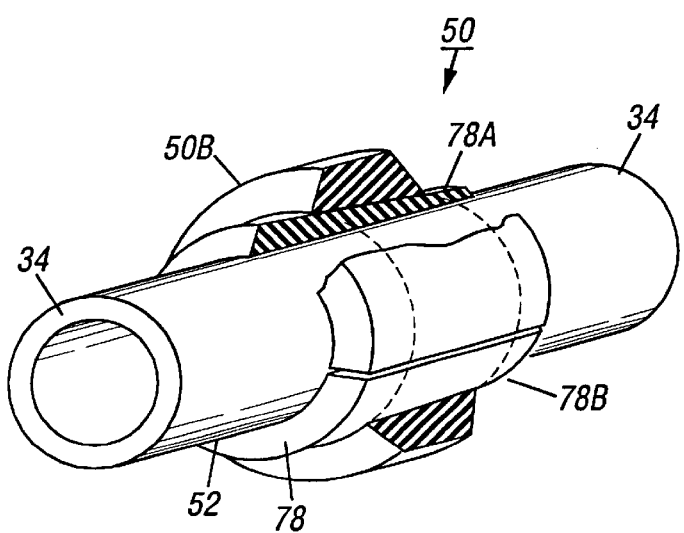
FIG. 8 is a partially sectioned isometric view of an alternate embodiment of a centralizer.

FIG. 8 illustrates another embodiment of the insulated centralizer 50. Here centralizer body 50B and tapered sleeve 78 are molded and/or machined as before from a strong, non-charring plastic such as Nylon or DELRIN. Centralizer is assembled by placing the two halves 78A and 78B of the tapered sleeve around the inner pipe 34 and coating 52. Then the tapered inner surface of the centralizer 50B is forced longitudinally over the tapered outer surface of the sleeve 78, providing an interference fit which secures the sleeve to the pipe 34. Finally, centralizer body 50B is secured to the tapered sleeve 78 by adhesive bonding or by welding of the plastic parts. Precautions to prevent arcing due to contaminants are fewer and less critical with this embodiment, since the centralizer does not have any radial slits as with the other embodiments.

Although, the inner pipe 34 is substantially aligned coaxially with the outer pipe 32 with centralizers 50, it is desired to provide a flow path in the form of gaps or longitudinal channels between centralizers 50 and the outer pipe 32, through which the annulus can be evacuated or filled with an arc-suppressing gas as discussed above. This flow path may be created by making the outer diameter of the centralizers 50 a little smaller (by 0.2 to 0.4 inch, say) than the inner diameter of the outer pipe 32, or by forming longitudinal grooves or scallops (not shown) into the outer surfaces of the centralizers 50.

The centralizers are placed at longitudinal intervals which will prevent the inner pipe from buckling due to installation or operational loads. In practice, this interval between centralizers may be about 10 to 20 feet. The inner pipe is thus prevented from moving into such proximity with the outer pipe that an arc or direct contact might result.

Figure 5:
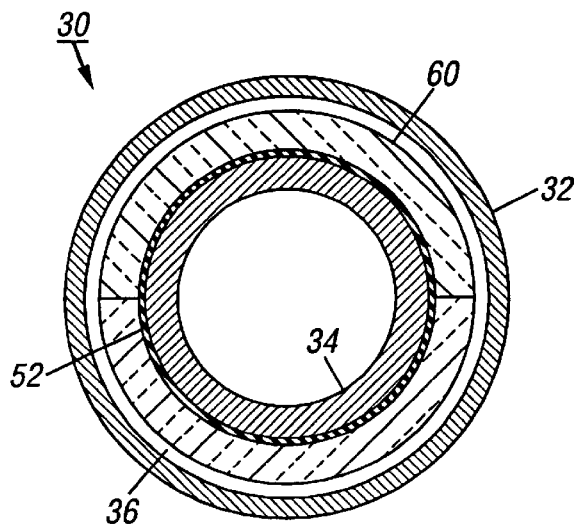
FIG. 5 is an axial cross sectional view of a thermal insulator of the embodiment of the present invention of FIG. 2, taken at line 5—5 in FIG. 2.

FIG. 5 illustrates a cross section through pipe-in-pipe flowline 30 at a ring of insulated panels 60. Describing the components from the inside out, the product flowline or inner pipe 34 is provided a smooth, continuous inner surface that does not promote fouling and is piggable as may be necessary to clear the line or for other purposes. The outside of inner pipe 34 is provided a thick coating 52 of an arc-resistant material such as high density polyethylene or polypropylene which may be extruded over an initial corrosion resistant coating. A pair of low density plastic foam insulation panels of a material such as polyisocyanurate are assembled about inner pipe 34 for insulative coverage between centralizers 50 (see FIG. 2). These may be conveniently handled in 4- to 6-foot long sections or so. These panels are glued or taped in place with electrically insulative, arc-resistant materials about the inner pipe and a seal secured with the abutting centralizers 50. This low density foam is partially open celled so that evacuation of the annulus, then filling it with Sulphur Hexafloride ($SF_6$) injection operations will tend to fill the voids with arc-suppressing, thermally insulative gas. Further, the surface of panels 60 may be coated for increased char-resistance. In particular, anti-char coatings such as a silicon rubber based compound marketed by Dow under the name SYLGARD may be used immediately adjacent centralizers 50. The characteristics of the low density plastic foam may be selected for inhibiting its tendency to crumble and create debris within annulus 36. If desired, a MYLAR brand aluminized plastic film can be affixed to the outside of the panels, shiny side out, to reduce radiant heat loss.

Further, the seams formed by adjoining pieces of foam insulation could allow possible contaminants such as pipe scale and/or water to form a path to the inner pipe and result in electrical failure across the annulus. The foam insulation may be conveniently wrapped with an adhesive backed membrane to ensure against this risk. A suitable membrane is permeable to air and water vapor, allowing their removal from the foam under vacuum, but blocking entry of liquid water and solids such as pipe scale. TYVEK® brand membrane, a material marketed by DuPont, would be useful for such embodiments.

The interior of outer pipe 32 is preferably treated to prevent the formation of scale which might bridge the annulus or initiate an arc. Such treatment might include a pickling operation with acid and oil treatments, or blast cleaning followed by internal coating with epoxy or nylon or installation of a liner. If a liner is installed, it could include a MYLAR brand aluminized plastic film to further limit radiant heat loss.

Finally, the outside of outer pipe 32 will typically be provided with a corrosion resistant coating and cathodic protection as commonly deployed in offshore applications, e.g., a fusion bonded epoxy coating, together with sacrificial anodes spaced at intervals along the pipeline. Further, if DC power transmission is used, the polarity should be such as to further cathodically protect the outer pipe.

Figure 6:
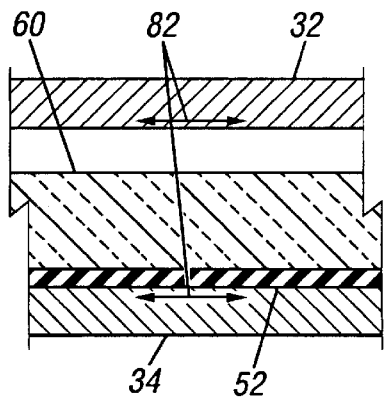
FIG. 6 is a longitudinal cross sectional view of the pipeline walls and the annulus in accordance with an embodiment of the present invention.

It should be noted that AC power has several benefits over DC power, and is preferred for this application. First, the power and voltage requirements for direct electrical heating of the pipeline and power transmission to the satellite wells is within conventional AC power engineering limits and is already available on platforms in standard 60 Hertz power plant configurations. Although it may be desirable to alter the frequency in certain applications, the basic power commitments for pipe lengths up to 40 miles, and perhaps more, may be achievable without special purpose generators. Second, DC power raises significant concerns about corrosion control for the underwater pipelines, which is not an issue for AC power. Finally, in a pipe-in-pipe flowline, the skin effect and proximity effect associated with AC power cause the current to travel on the outside of inner pipe 34 and the inside of outer pipe 32. See arrows 82 in FIG. 6. Safety is enhanced as almost no voltage potential is present on the outside of carrier pipe 32.

FIGS. 7A–7D illustrate one method for installation of a pipe-in-pipe flowline suitable for direct electric pipeline heating and other power transmission to remote subsea wells. In FIG. 7A, Carrier pipe 32A is suspended on end in slips 90 at weld floor 92 of a J-lay installation barge. Collar/elevator 96A engages shoulder 94 presented on the end of pipe sections of carrier pipe 32A to secure this suspension. An end of a section of product flowline 34A extends out of carrier pipe section 32A. These pipes are joined together at the terminal end as shown in FIG. 2. Since the centralizers 50 provide substantial lateral support and prevent buckling between outer pipe 32A and inner pipe 34A, these centralizers thereby also prevent relative longitudinal movement (sliding) between the two pipes, even when suspended vertically as shown in FIGS. 7A–7D.

Another concentrical arrangement of inner and outer pipe sections 34B and 32B, respectively, is lowered into place for joining into the pipeline while supported by the collar/ elevator 96B. The internal plug 98 on the upper end of the vertically approaching inner pipe section 34B allows the inner pipe to extend beneath outer pipe 32B, but not to slide farther down.

In FIG. 7B, inner pipes 34A and 34B are brought into position and welded together. Special care is taken to prevent the deposition of debris into the annulus as installation proceeds. The inner pipe weld is coated, e.g., by a shrink sleeve of polyethylene or polypropylene, which provides continuity to both corrosion coating and arc-resistant barrier coating 52 on the outside of inner pipe 34.

High temperature thermal insulation material such as mineral wool 53 is placed in the annulus between the two welds as a protection to other heat sensitive materials in the annulus. Otherwise, heat might damage membranes, coatings, and/or insulative foam under the weld, creating a charred material and possible electrical path to the inner pipe. It is convenient to fabricate and install this char-resistant refractory material as "clamshell" halves similar to the foam insulation. It is only necessary that this protection extend for a few inches to each side of the weld.

Then outer pipe 32B is lowered into alignment with outer pipe 32A and welded into place. See FIG. 7C. An appropriate corrosion coating is applied to the outer pipe weld, collar/elevator 96A is removed, the assembled pipe-in-pipe section is lowered through the slip until pipeline is suspended by collar/elevator 96B, and internal plug 98 is removed. See FIG. 7D. This J-Lay process then repeats with adding successive sections to the pipe-in-pipe flowline 30.

Alternatively, these vertical pipe assembly techniques may be utilized horizontally to install pipe-in-pipe flowlines by the S-Lay method. As another possible alternative, long sections, e.g., 1500 feet or so, of inner pipe 34 and outer pipe 32 may be assembled onshore, strung together into concentric relation, and sequentially reeled onto a large diameter reel for later installation offshore.

The pipe-in-pipe configuration of subsea pipeline 10 is also useful for leak detection. In embodiments maintaining a vacuum in the annulus, a leak in the outer pipe will manifest as water vapor in vacuum pump discharge 56A. See FIG. 2. Pressuring up the annulus with dry air or nitrogen will discharge bubbles 102 to locate the leak, see FIG. 1. The exact position of the leak could then be pinpointed with an ROV inspection of the exterior of the pipeline, and an external leak repair clamp can be installed at the point of failure to seal the leak. A leak in the inner pipe will be observed as hydrocarbon vapor in the vacuum pump discharge and might be located through use of an inspection pig. Repair of an inner pipe leak will require cutting the pipeline, removal of the damaged section, and re-joining of both outer and inner pipes on the seafloor with mechanical connections.

Alternately, by maintaining a constant volume charge of arc-suppressing gas such as Sulphur Hexafloride ($SF_6$) in the annulus of a pipe-in-pipe flowline, any increase in annulus pressure would signal seawater intrusion through a breach in the carrier pipe. Again, the annulus could be pressured up to leave a bubble trail to reveal the location of failure. Further, in the event of any failure of the inner pipeline, the Sulphur Hexafloride ($SF_6$) could be used a as a tracer. The annulus could be pressured up incrementally and held, and the appearance of the tracer gas at the collection point would be indicative of the pressure at which the annulus pressure exceeded the flowline pressure. This then correlates roughly to position along the pipeline. Alternatively, the travel time for a charge of high pressure gas in the annulus to enter the flowline and appear at a collection point could be correlated to approximate location along the pipeline.

At commissioning, air and water are removed from the annulus, and arcsuppressing and thermally insulative gas is injected, if desired, as discussed above. After connecting the power input to the flowline at the platform end, the level of electrical power is brought up slowly so that any arcing initiated by minor debris or contamination might occur with minimal damage. Progress in application of power to the system and resulting temperature increases at both ends of the pipeline would be monitored carefully. When brought to operational levels, it may be desired to establish calibration of actual power and voltage input to heating output by placement of thermocouples 100 at appropriate locations along the pipeline.

In operation, the modified pipe-in-pipe flowline provides convenient power transmission for direct electric heating of the pipeline and for driving remote electrical components. The heating is useful for preventing hydrate formation and paraffin deposition, and for enhancing flow of heavy crudes. This is particularly important while maintaining well fluids within a shut-in subsea pipeline. It is also useful for reversing blockages caused by hydrate formation and paraffin disposition at somewhat higher, but nonetheless practical power levels. Further, it should be noted that pulses and frequency modulation can be carried as control signals along with the power transmission to control components at remote satellite subsea wells or the like.

Other modifications, changes and substitutions are intended in the foregoing disclosure and in some instances some features of the invention will be employed without a corresponding use of other features. Accordingly, it is appropriate that the appended claims be construed broadly and in the manner consistent with the spirit and scope of the invention herein.

What is claimed is:

1. A method for installing an offshore pipeline, comprising:
   structurally connecting an inner pipe and an outer at a terminal end of a pipe-in-pipe flowline having an annulus between the inner and outer pipes;
   placing centralizers in the annulus to prevent buckling of the inner pipe which takes lateral support from the outer pipe;
   suspending the working end of the pipeline under construction in a substantially vertical position within slips at the weld floor of a J-lay installation barge;
   adding a section of inner pipe, comprising:
      grasping a section of inner pipe, orienting the section of inner pipe to a vertical position;
      bringing the section of inner pipe into abutting position with the inner pipe at the working end of the pipeline under construction;
      welding the section of inner pipe to the inner pipe of the working end of the pipeline under construction; and
      coating the inner pipe with an arc resistant material;
   adding a section of outer pipe, comprising:
      grasping a section of outer pipe, orienting the section of outer pipe to a vertical orientation;
      sliding a section of the outer pipe down over the section of inner pipe just welded to the working end of the pipeline under construction;
      bringing the section of outer pipe into abutting position with the working end of the pipeline under construction; and
      welding the section of outer pipe to the outer pipe of the working end of the pipeline under construction presented through the slips at the weld floor of the installation barge;

advancing the end of the working end of the pipeline through the slips to bring the end of the section of outer pipe added adjacent the weld floor; and repeating the foregoing steps to add additional sections of inner and outer pipe as necessary to complete the pipeline.

2. A method for installing an offshore pipeline in accordance with claim 1 wherein grasping a section of inner pipe comprises connecting an internal plug within an end of the section of inner pipe.

3. A method for installing an offshore pipeline in accordance with claim 2 wherein grasping a section of outer pipe comprises engaging a collar / elevator about a shoulder presented on an end of the section of outer pipe.

4. A method for installing an offshore pipeline in accordance with claim 3 wherein the sections of inner and outer pipe are grasped concentrically and brought into position over the working end of the pipeline under construction.

5. A method for installing an offshore pipeline in accordance with claim 4 further, comprising taking steps to prevent water and debris from entering the annulus between the inner and outer pipes during construction.

6. A method for installing an offshore pipeline in accordance with claim 5 wherein coating the weld at the inner pipe with an arc resistant material comprises sealing the weld with a shrink sleeve.

7. A method for installing an offshore pipeline in accordance with claim 6, further comprising installing insulated panels over the shrink sleeve.

8. A method for installing an offshore pipeline in accordance with claim 7, wherein the insulated panels between the two welds comprise a high temperature thermal insulation material.

9. A method for installing an offshore pipeline in accordance with claim 1, further comprising providing a corrosion coating over the outside of the weld joining the section of outer pipe to the outer pipe of the working end of the pipeline.

* * * * *